No. 834,198. PATENTED OCT. 23, 1906.
T. J. FEGLEY.
ICE CREAM FREEZER.
APPLICATION FILED JUNE 25, 1904.
2 SHEETS—SHEET 1.
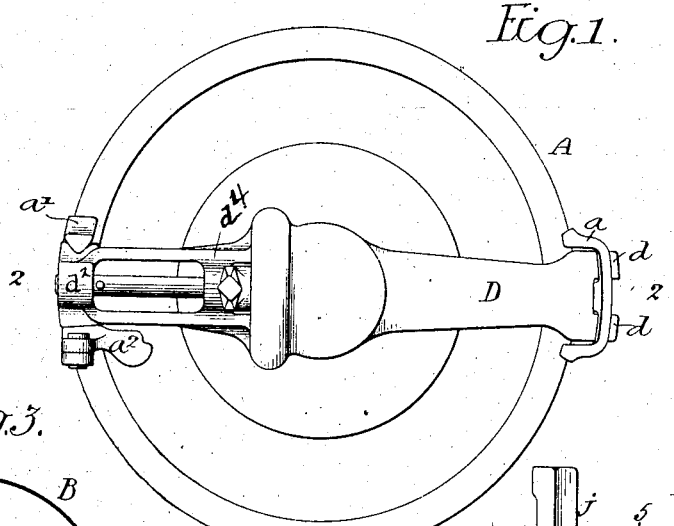
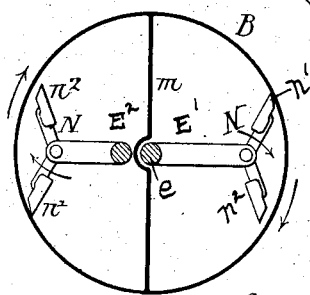
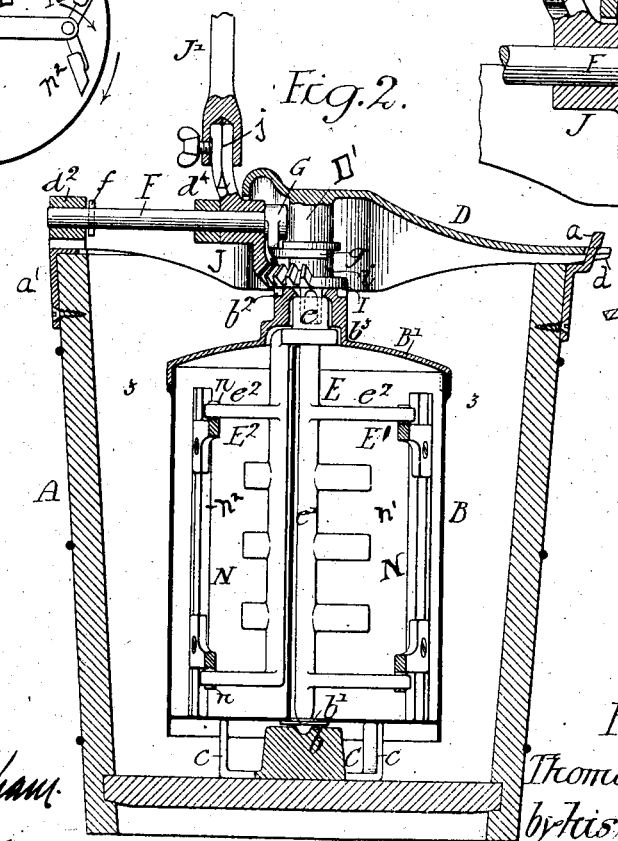
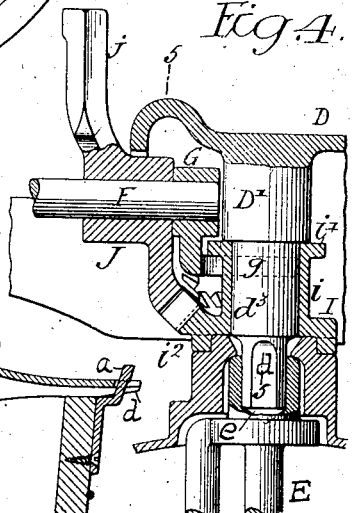
Witnesses:
Frank L. A. Graham.
Titus N. Lyons.
Inventor:
Thomas J. Fegley,
by his Attorneys,
Howson & Howson No. 834,198. PATENTED OCT. 23, 1906.
T. J. FEGLEY.
ICE CREAM FREEZER.
APPLICATION FILED JUNE 25, 1904.
2 SHEETS—SHEET 2.
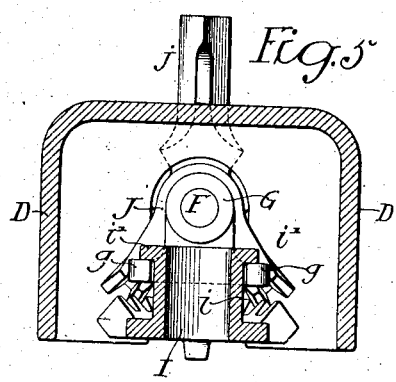
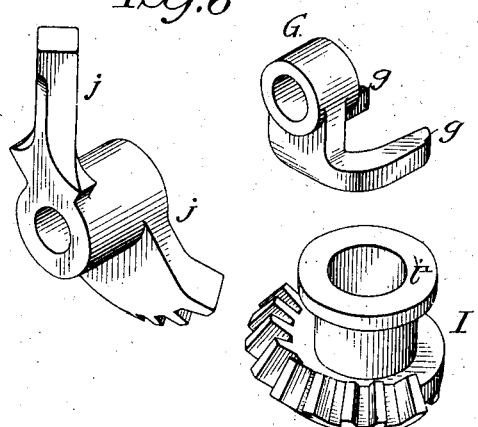
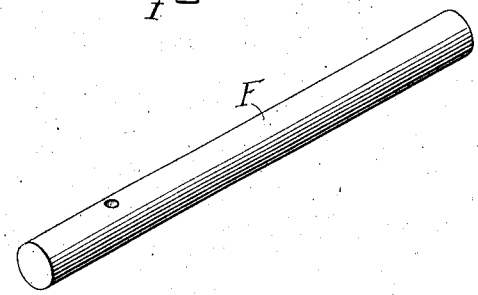
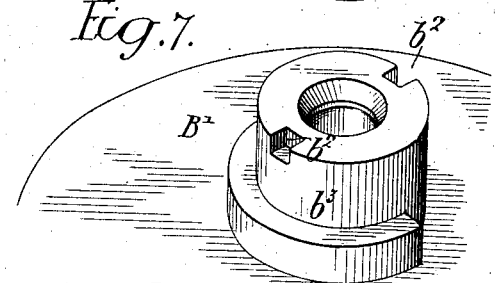
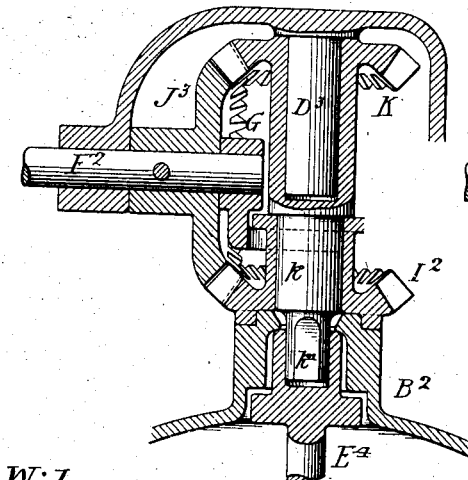
Witnesses:
Frank L. A. Graham.
Titus H. Irons.
Inventor:
Thomas J. Fegley,
by his Attorneys:
Howson & Howson

UNITED STATES PATENT OFFICE.

THOMAS J. FEGLEY, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

ICE-CREAM FREEZER.

No. 834,198.     Specification of Letters Patent.     Patented Oct. 23, 1906.

Application filed June 25, 1904. Serial No. 214,122.

*To all whom it may concern:*

Be it known that I, THOMAS J. FEGLEY, a citizen of the United States, residing in Philadelphia, Pennsylvania, have invented certain Improvements in Ice-Cream Freezers, of which the following is a specification.

The main object of my invention is to so construct the operating mechanism of an ice-cream freezer that it can be cheaply made, readily assembled or taken apart, and which will require very little fitting, yet when the parts are together it will be substantial and easily operated.

A further object of the invention is to so construct a freezer of the reciprocating type as to cause the scrapers of the dasher to automatically adjust themselves in position to scrape the can.

These objects I attain in the following manner, reference being had to the accompanying drawings, in which—

Figure 1 is a plan view of an ice-cream freezer illustrating my invention. Fig. 2 is a vertical sectional view on the line 2 2, Fig. 1. Fig. 3 is a sectional plan view of the can on the line 3 3, Fig. 2. Fig. 4 is an enlarged view showing the operating mechanism in detail. Fig. 5 is a section on the line 5 5, Fig. 4. Fig. 6 is a perspective view showing the details of the operating mechanism detached. Fig. 7 is a perspective view of the top of the can. Fig. 8 is a view illustrating my invention in connection with a freezer in which both the dasher and the can rotate, and Fig. 9 is a view showing another modification of the invention.

A is the tub of an ice-cream freezer, in which is mounted the can B.

D is the cross-frame, which is attached to the tub, as clearly shown in Fig. 1. Projections $d$ $d$ on this cross-frame enter openings in the casting $a$, secured to one side of the tub, and the opposite end of the frame is clamped in the present instance to a casting $a'$ by means of a clamping-lever $a^2$. This clamping means forms no part of my invention.

The can B has a central projection $b$, mounted on a bearing C, secured to the bottom of the tub. This bearing has arms $c$, which prevent the can tipping to any great extent and allow for the packing of the ice under the can. The can has a top B', which is secured to the can in any suitable manner.

On the frame D is a projecting stud D', which has a portion $d$ extending into a cavity $e$ in the head of the dasher E. The lower end of the dasher fits into a cavity $b'$ in the bottom of the can B. Thus the dasher is held centrally, yet the can is free to reciprocate or rotate around it.

F is a bar mounted in bearings $d^2$ and $d^4$ on the frame D and carrying at its end a support G, having arms $g$ $g$, forming a fork which engages the hub $i$ of the segmental gear I. This segmental gear is mounted on a portion $d^3$ of the stud D' and has a flange $i'$, which rests upon the arm $g$ of the forked support G, so that when the parts are in position the support G will hold the segmental gear I in proper position on the stud D', preventing it becoming detached when the cross-frame D is removed from the tub.

J is a toothed structure in the form of a segmental gear having teeth which mesh with the teeth of the gear I, and this gear is mounted on the bar F between the bearing $d^2$ and the support G. In the present instance this gear is loose on said bar and has an arm $j$, which is preferably squared, so that an operating-lever J' can be placed over the squared portion of the arm for the purpose of reciprocating the gear J, as my invention, as shown in Figs. 1 to 7 inclusive, is adapted to a reciprocating freezer.

The bar F is held in position by a pin $f$, which passes through a suitable opening therein directly back of the bearing $d^2$, and as this bar need not necessarily rotate it simply acts as a support for the segmental gear J and the detachable support G.

On the under side of the gear I in the present instance are two lugs $i^2$, which enter cavities $b^2$ in the projections $b^3$ of the cap B' of the can, so that when the parts are assembled as shown in Fig. 2 and the lever J' is reciprocated its motion will be imparted, through the gears J and I, to the can, which will also be reciprocated.

The can B in the present instance has a partition $m$, dividing the can into two parts for the purpose of enabling the user to freeze two kinds of ice-cream at once, and the dasher E is made in two parts E' E² to straddle the partition, one part being on one side of the partition and the other on the opposite side. The partition is recessed, as shown in Fig. 3, to enable the stem $e'$ to be in the central position.

On each of the sections are arms $e^2$, in which are openings for the reception of the pivot-pins $n$ $n$ of the scrapers N. Each scraper N is made double, having two blades $n'$ $n^2$, one projecting on one side of the center and the other on the opposite side, and these blades preferably rest on the bottom of the can, as shown in Fig. 2.

When the can is moved in the direction of the arrow, Fig. 3, the friction of the bottom of the can against the end of the blades will cause the blade $n'$ to move out in the direction of the arrow on its pivot against the body of the can, scraping it and removing the frozen material from the can, while the other blade $n^2$ is moved away from the body of the can, but causes the material which is not in a frozen state to be forced against the body of the can, thus producing the best action possible for evenly freezing the material.

When the can is reversed, the blade $n^2$ is forced against the body of the can and the blade $n'$ withdrawn. Thus in reciprocating the can by the mechanism above described the blades scrape the surface of the can and rapidly freeze the material in the two sections of the can.

It will be understood that while my invention is particularly adapted for this class of freezers it can be used as well with a freezer in which the can is rotated in one direction, or in which the can is rotated in one direction and the dasher in the opposite direction, or in a freezer where the dasher only is rotated.

It will be seen in referring to Figs. 2, 4, and 5 that the parts can be readily assembled without requiring to be finished to any great extent, and when assembled the parts will be held in proper alinement, so as to make the working of the mechanism easy, and when it is wished to detach the elements all that is necessary is to withdraw the pin $f$ from the bar F, remove the bar, when the two segmental gears J and I and the support G will immediately become detached.

It will be understood that in designing the operating mechanism of an ice-cream freezer the parts must be so formed that the working of the same will not be affected by dampness or neglect, and they must be made to withstand the rough usage to which devices of this kind are subjected.

In Fig. 9 I have shown my invention applied to a machine in which the shaft F' is a driven shaft and being turned either by a hand-crank or by power and having secured to it a toothed structure in the form of a beveled gear-wheel $J^2$, which meshes with a gear-wheel I' on a stud $D^2$, projecting from the frame. The stud has an extension which enters a cavity in the end of the dasher $E^3$, and the cap of the can is notched to receive the projection on the gear-wheel. The support G is the same as shown in Fig. 4, and its arms extend on each side of the hub of the wheel I'.

In Fig. 8 I have shown a construction in which both the dasher and the can rotate. The shaft $F^2$ has a toothed structure in the form of a gear $J^3$, which meshes with a bevel gear-wheel $I^2$, attached to the cap $B^2$, and the wheel $J^3$ also meshes with a bevel-wheel K, mounted on a stud $D^3$, projecting from the cross-frame. The hub of this gear-wheel K, is extended and forms a bearing $k$ for the gear-wheel $I^2$ and has an extension $k'$, which enters a cavity in a dasher $E^4$. The support G is mounted on the end of the shaft $F^2$ and is forked to receive the flanged hub of the gear-wheel $I^2$. By this arrangement the dasher is turned through the medium of the gears $J^3$ and K, while the can is turned through the medium of the gears $J^3$ and $I^2$.

I claim—

1. The combination in an ice-cream freezer, of a cross-frame, a bar mounted on the cross-frame, a gear-wheel mounted on the cross-frame, means engaging the gear-wheel for operating the same, and a support carried by the bar and engaging the gear-wheel so as to retain the gear-wheel in position on the frame, substantially as described.

2. The combination in an ice-cream freezer, of a cross-frame, a bar on the frame, a toothed structure mounted on the bar, a gear-wheel mounted on a stud carried by the frame and meshing with said toothed structure, and a support carried by the bar and engaging the gear-wheel so as to hold it in position, substantially as described.

3. The combination in an ice-cream freezer, of a cross-frame, a stud thereon, a gear-wheel mounted on the stud, a bar arranged at right angles to the stud, a toothed structure on the bar meshing with the gear-wheel on the stud, a support mounted on the end of the bar and forked to engage the gear-wheel on the stud and hold it in gear with the toothed structure on the bar, substantially as described.

4. The combination in an ice-cream freezer, of a cross-frame, a stud projecting from the frame, a gear-wheel mounted on the stud and having a flanged hub, a bar mounted on the frame at right angles to the stud, a toothed structure on the bar meshing with the gear-wheel on the stud, a support mounted on the bar and forked to receive the hub of the gear-wheel on the stud, the flange of said gear-wheel resting upon the forked portion of the support, substantially as described.

5. The combination in an ice-cream freezer, of a cross-frame, a stud thereon, a gear mounted on the stud and having a flanged hub, a bar mounted on the frame at an angle to the stud, a toothed structure mounted on the bar meshing with the said gear, a support on the bar forked to engage the hub of the gear, and a pin for retaining the bar in position, substantially as described.

6. The combination in an ice-cream freezer, of a cross-frame, a stud projecting from the cross-frame and engaging the dasher of an ice-cream freezer, a gear-wheel having a flanged hub mounted on said stud and engaging the can of the ice-cream freezer, a bar, a toothed structure on the bar meshing with the gear and having means whereby it may be operated, and a support carried by the bar and forked to engage the flanged hub of the first-mentioned gear-wheel, substantially as described.

In testimony whereof I have signed my name to this specification in the presence of two subscribing witnesses.

THOMAS J. FEGLEY.

Witnesses:
WILL. A. BARR,
JOS. H. KLEIN.